Figure 1:
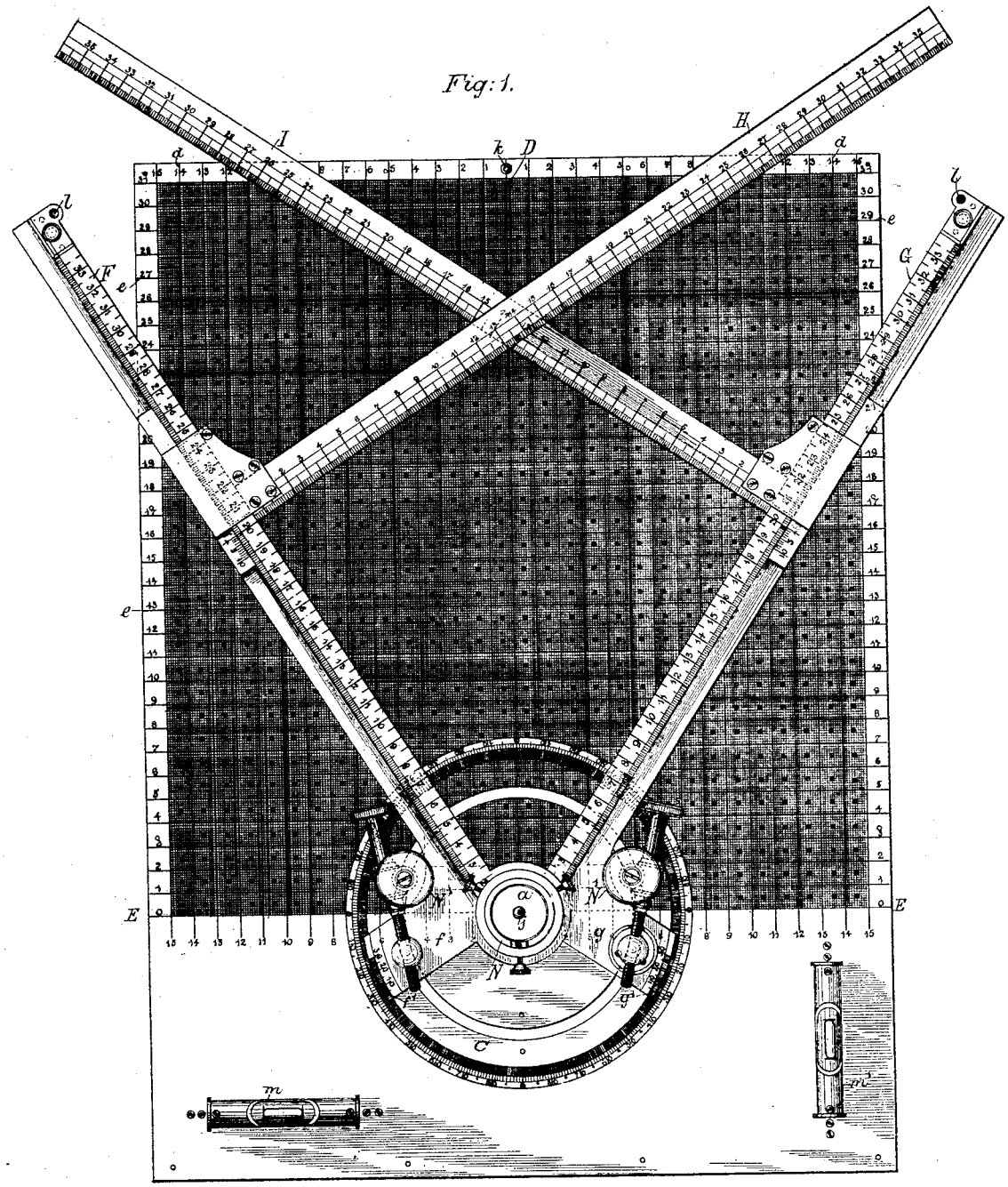

(No Model.)  R. BROTHERHOOD.  5 Sheets—Sheet 1.
TRIGONOMETER.

No. 462,234.  Patented Nov. 3, 1891.

Witnesses:
Chas. Woodruff
Robt. A. Blake

Inventor:
Rowland Brotherhood.
by Henry H. Leigh,
Attorney.

(No Model.)  5 Sheets—Sheet 2.

R. BROTHERHOOD.
TRIGONOMETER.

No. 462,234. Patented Nov. 3, 1891.

Witnesses
Chas.␣Woodruff
Robt. A. Blake

Inventor:
Rowland Brotherhood,
by Henry H. Leigh.
Attorney.

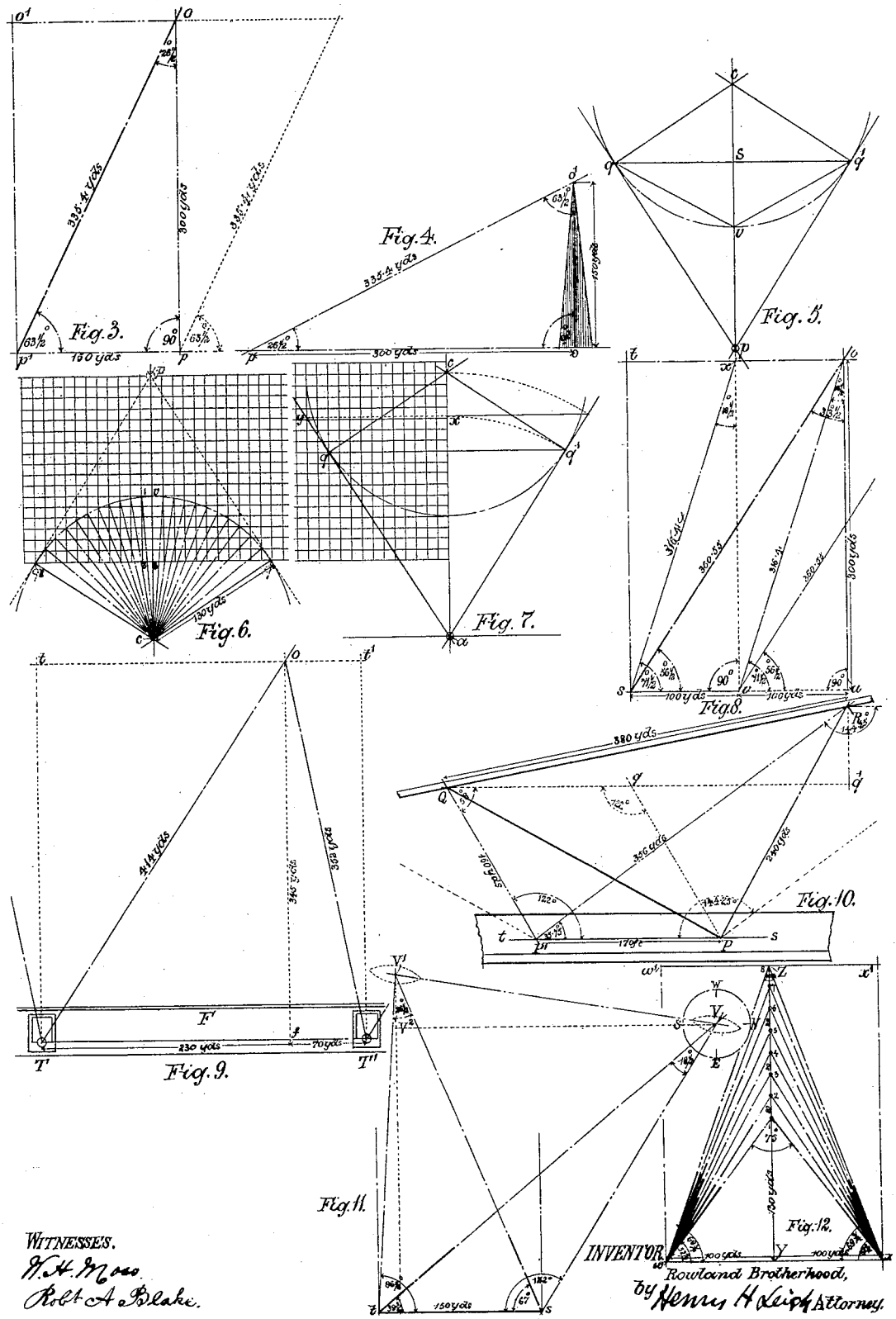

(No Model.) 5 Sheets—Sheet 4.
R. BROTHERHOOD.
TRIGONOMETER.

No. 462,234. Patented Nov. 3, 1891.

Witnesses: Inventor:
Rowland Brotherhood,
by Henry H. Leigh,
Attorney.

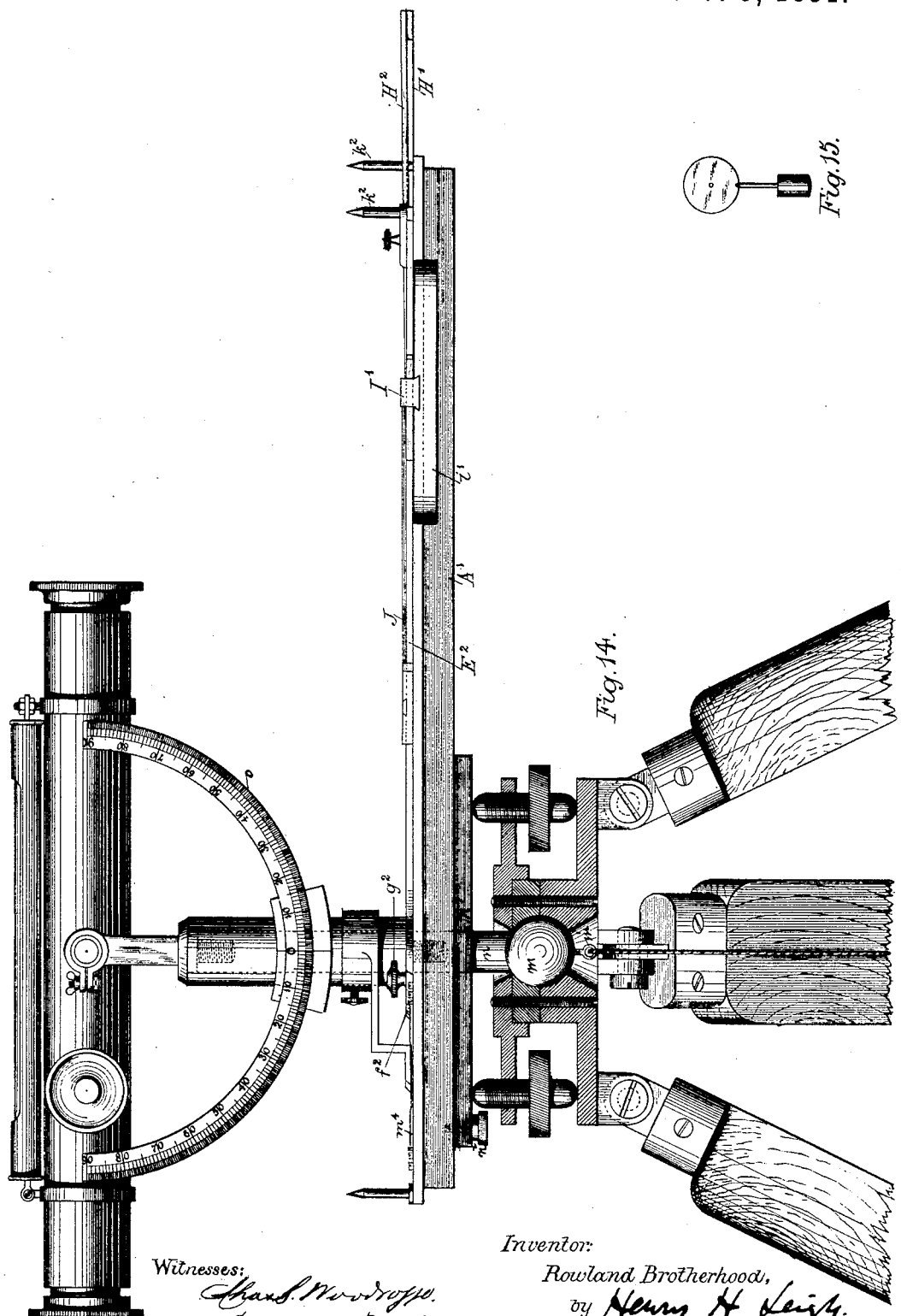

United States Patent Office.

ROWLAND BROTHERHOOD, OF LONDON, ENGLAND.

TRIGONOMETER.

SPECIFICATION forming part of Letters Patent No. 462,234, dated November 3, 1891.

Application filed July 28, 1890. Serial No. 360,243. (No model.) Patented in England April 9, 1889, No. 6,084, and December 13, 1889, No. 20,088.

*To all whom it may concern:*

Be it known that I, ROWLAND BROTHERHOOD, engineer, a subject of the Queen of Great Britain and Ireland, residing at No. 8 Adelphi Terrace, London, in the county of Middlesex, England, have invented an Improved Trigonometer, (for which I have received Letters Patent in Great Britain, No. 6,084, dated April 9, 1889, and No. 20,088, dated December 13, 1889,) of which the following is a specification.

My invention relates to an improved trigonometer for the use of engineers and surveyors; and its object is to enable the user to find radii, tangents, angles, chords, half-chords, versines, distances, and altitudes and to solve other and similar problems without it being necessary to have recourse to arithmetical calculations, the usual arithmetical calculations being replaced by certain adjustments of the members of the instrument which forms the subject of my present invention, and these having been effected the solution of the problem can be forthwith read off.

In carrying the present invention into effect I provide a plate mounted with a suitable joint capable of motion in any direction upon the top of a suitable stand after the manner of the well-known theodolite. The point on the plate immediately over the center of the joint is the center of the trigonometer, and through this center are drawn two lines at right angles with each other. These lines are the base and transverse base lines, respectively, the former extending from the center of the trigonometer to the end of the trigonometer-plate and the latter from side to side. About the center of the plate is set out a protractor divided into four quarters by the base-lines above mentioned. I provide a pair of bars, hereinafter called "tangent-bars," which are pivoted by their ends about the said center, and their inner ends are provided with arms projecting therefrom at right angles and carrying verniers to be used upon the protractor. Each tangent-bar has a T square sliding on it by its head. These T-squares I call "radial bars." The surface of the trigonometer-plate is graduated in both directions. The tangent and radial bars are graduated to correspond—*i. e.*, all the scales on the instrument have a common unit to which any denomination can be applied. The zero of the tangent-bars common to both is in the center of the trigonometer and that of the radial bars in the scales on the respective tangent-bars. The transverse graduations on the trigonometer-plate run right and left from the base-line. The latter and the graduations parallel therewith have their zero on the transverse base-line. Suitable sights are fitted at the end of the base-line and on the ends of the tangent-bars. A movable sight adapted to be fixed in the center of the trigonometer is also provided and is intended to be used for short-distance work. For long-distance work and for work to be done in the vertical plane I replace the movable sight by a theodolite.

The following description of how the distance a given object is from the station-point is ascertained by my invention will give the reader a clear idea of its principle and practice. The trigonometer is set with its center vertically over the station-point. Its plate will then represent the whole area included in the survey. The transverse base-line is then produced in either direction, and for a definite distance—say, to the right—and for one hundred yards. The end of this line is a second station-point, to which the trigonometer is moved with its transverse base-line coinciding with its production. The left-hand tangent bar is set so as to sight the object. The transverse base-line on the plate from zero to 110, on the left-hand side of the trigonometer-center, is the base of a right-angle triangle, the tangent-bar last mentioned is its hypotenuse, and the line parallel with the base-line of the trigonometer, and which starts from the said 100 on the transverse base-line, is the perpendicular of the triangle, the apex of which is the intersection of the perpendicular and the tangent bar. This intersection is the equivalent of the position of the object, and as the plate and tangent-bars are all graduated every dimension can be read off, being interpreted in terms of the distance measured off—in this case, yards. If a distance, ascertained as just described, be noted on the trigonometer and the angle of inclination to the top of the object—*e. g.*, a mountain ascertained by the theodolite—be set out thereon by a tangent-bar, then will the base of the right-angle triangle be the height of the object. The apex angle of a curve, such as is required in railway work to join two straight portions of the road, is ascertained as follows: The said two straight portions will be tangential to the circle of which the curve is an arc. They are therefore produced until they intersect, and the trigonometer placed with its center over the intersection and its central base-line exactly bisecting the angle. The tangent-bars are set to sight the terminals of the straight portions, and the distance between the angle of the station-point and one of the terminals is set off upon both tangent bars by moving the radial bars upon them, so that their scales shall intersect the scales on the tangent bars where occur the points corresponding to the terminals. The intersection of the radial bars will give the position of the center of the circle and the other elements can be read off. The base-line will contain the radius, cosine, and versed sine, as well as the distance between center and apex angle. The transverse line on the plate which cuts the two tangent points will be the chord of the arc. The apex angle will be found on the protractor, and the curve may be laid down upon the trigonometer, as hereinafter explained at length.

In order that my present invention and the means by which it is to be carried into practical effect may be thoroughly understood, I will now describe them in detail, referring in so doing to the accompanying drawings, which are to be taken as part of this specification and read therewith.

Figure 2:
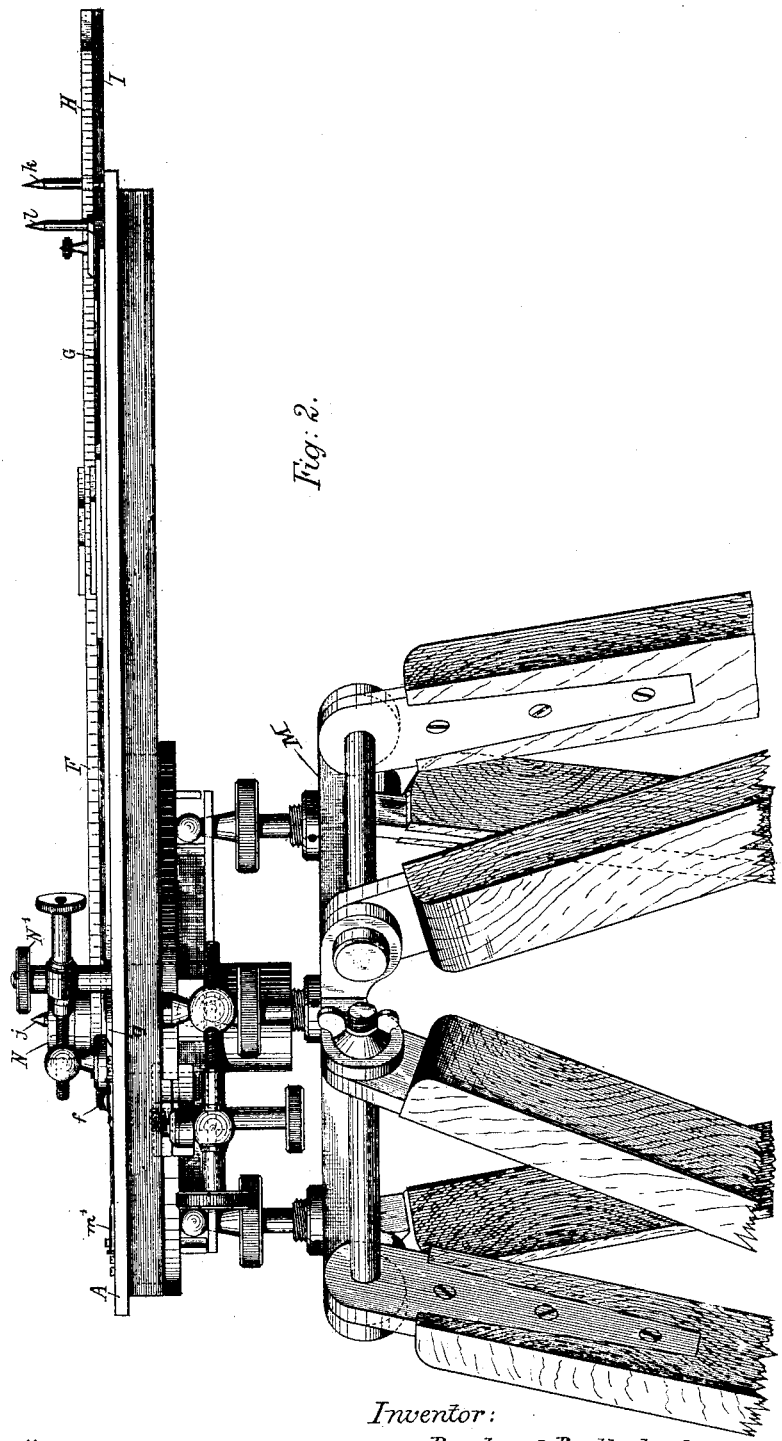
Figure 13:
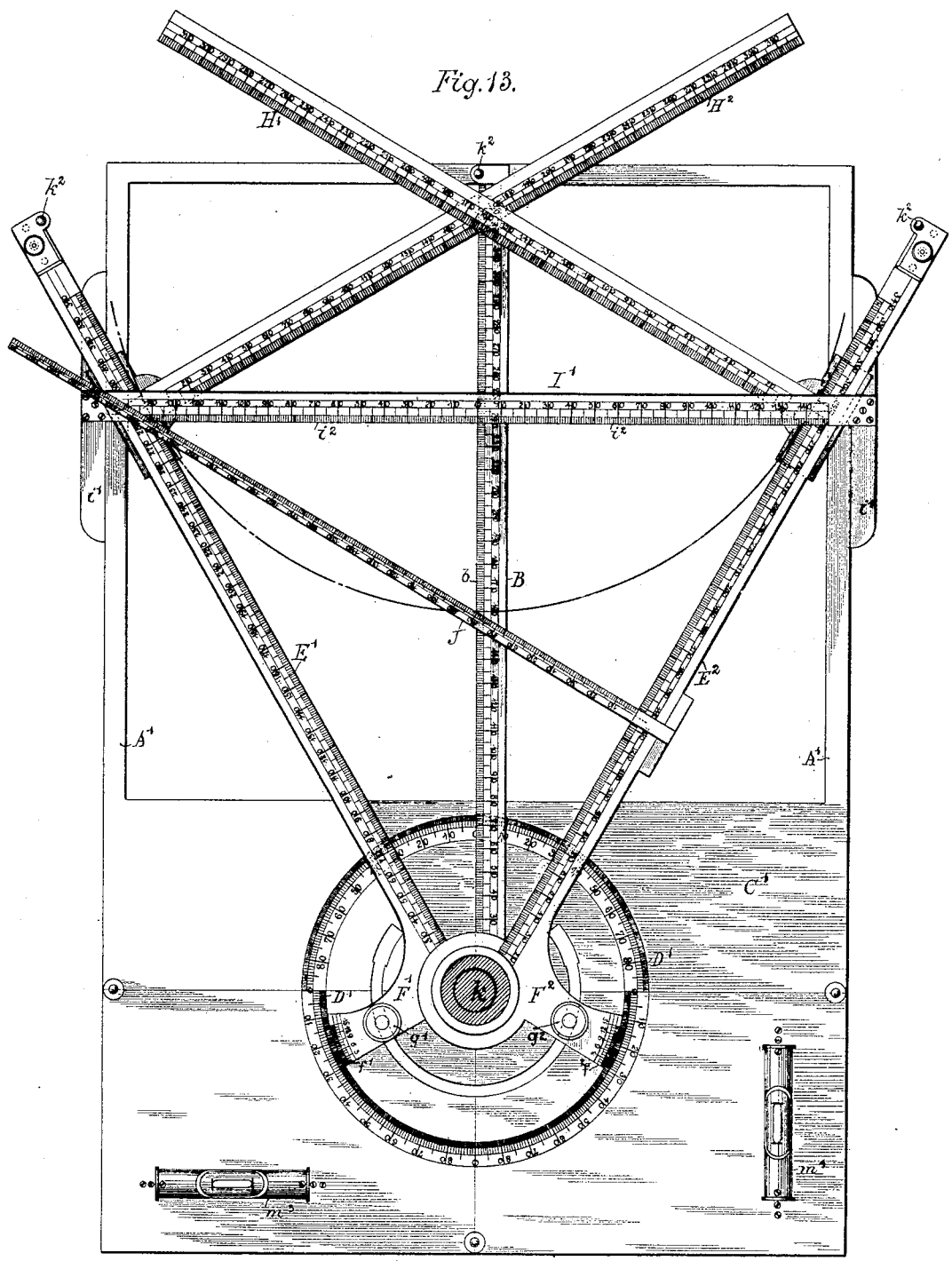

Figure 1 is a plan of the trigonometer-plate with its tangent and radial bars. Fig. 2 is a side elevation of the same and of the top of tripod-stand. Figs. 3 to 12 are diagrams illustrating some of the various problems which my invention is capable of solving, and also the methods of solving them, respectively. Figs. 13 and 14 are respectively a plan and side elevation of a modification of my invention. The theodolite is shown in its working position in the latter figure. Fig. 15 is an elevation of the detachable back sight to be used sometimes, as already explained, in lieu of the theodolite.

Referring to Figs. 1 and 2, A is the trigonometer-plate, and $a$ the center of the trigonometer.

C is a protractor about the center $a$.

D is the base-line, and E the transverse base-line, the scales of both having their zeros in the center of the trigonometer. These two lines meet at right angles in the said center, thereby dividing the protractor into four quadrants. Each intersection of the protractor is at once a zero and a ninety degrees.

F is the left-hand and G the right-hand tangent-bar. Both are movable, but independently of each other, about the center $a$.

$f\ g$ are two arms at right angles with the respective tangent-bars F G. They are engraved with scales $f'\ g'$. Inasmuch as the arms are at right angles with their respective tangent-bars the readings of a tangent-bar and its arm upon their respective quadrants of the protractor will always be the same.

H is the left-hand and I the right-hand radial bar. Both are made to slide up and down their respective tangent-bars F and G at right angles therewith and to move over each other. Each radial bar has its zero at the intersection of its scale with that on its tangent-bar.

$d\ d$ are lines parallel with the base-line D, each one capable of being used as a subsidiary base-line, as circumstances may require.

$e\ e$ are the chord-lines. The scales of the chord-lines run right and left from the base-line D, upon which are their respective zeroes. The subsidiary base-lines $d\ d$, on the contrary, have their zeros in the transverse base-line E. The scales of the tangent-bars, radial bars, base and subsidiary base-lines, transverse, base, and chord lines have a common unit, which is throughout them all equally subdivided, so that it can be read off in any term of length, as may be required, according to the absolute distances being dealt with. It will be noticed, also, that the said scales are set out on the metrical system; but it will be readily understood that this is a matter of detail or of convenience, and has nothing to do with the principle of my invention, although it may be regarded as adding to its convenience as a scientific instrument.

$j$ is the removable center sight, $k$ the sight at the extremity of the base-line, and $l\ l'$ the sights at the extremities of the tangent-bars. They are all of any convenient construction.

$m\ m'$ are two spirit-levels, each parallel with the base and transverse base lines, respectively.

N is a socket about which the tangent-bars are pivoted. It receives either the center sight $j$ or a leg depending from the center of a theodolite.

N' N' are screw devices of the well-known type for adjusting and locking the vernier-arms and tangent-bars.

The instrument is or may be mounted on a substantial tripod-stand, upon which it is movable in any direction. Fig. 2 shows it as mounted upon one of Stanley's three-screw adjustable tripod-stands.

With reference to the material and size of the instrument, as above described, these are points which are decided by considerations of portability, convenience, and durability, taking into consideration the circumstances under which such an instrument as a trigonometer is used. Instead of mounting the trigonometer in the way illustrated, it may be, if preferred, mounted upon a joint of a construction adapted to allow of the trigonometer-plate being turned up into the vertical plane on either the right or the left hand of the center of the trigonometer-plate, as well as to allow of the deflection of the said plate in front of or behind the said center.

The advantage of being able to turn the plate into the vertical plane is that then the user will be able to take vertical angles with the tangent-bars. In the following problems, however, this vertical position is not introduced, inasmuch as its utility and the circumstances under which it would be useful will be apparent to any efficient surveyor.

Having described the construction of the instrument, I will now proceed to describe some of the uses to which it can be put.

*Problem 1. To ascertain the distance of a given object from a given point.* (See Fig. 3.)— Let o be the given object and p the given point or station-point. Fix the trigonometer with its center a vertically over the station-point and adjust the plate until the object o is sighted along the base-line D. Having done this, set out a line either to the right or left, (in the case illustrated in the figure it is to the left,) taking care to align it with the transverse base-line E, or, in other words, to lay it down at a right angle with the line p o. This can be effected by setting the left-hand tangent-bar at a right angle with the base-line and taking a sight along it. The length of this second line is quite arbitrary; but it is preferable that it be within the scale of the transverse base-line, which is its equivalent on the trigonometer-plate, just as the line p o is represented on the trigonometer-plate by some portion of the base-line D. If, however, this cannot be done, then the scale of the survey must be reduced and the reading of the instrument afterward multiplied accordingly. According to the diagram this arbitrary distance has been measured off one hundred and fifty yards. This settles the unit value (for this particular survey) of each subdivision on the trigonometer as one yard. The end of the line p p' establishes a second station-point p', to which the trigonometer is transferred and fixed over it in the same way as it was at first fixed over the point p, the alignment of the transverse base-line E with the line p p' being accurately settled by sighting back to the original station-point. The base-line D, as the trigonometer now stands, will, as to some portion of it, be the equivalent of the line p' o' and be also parallel with the line of sight p o, which latter is now represented on the trigonometer-plate not by the base-line D, but by the subsidiary base-line one hundred and fifty subdivisions (=yards) to the right of it. Next sight the object o along one of the tangent-bars (G, for preference) and where it cuts the said subsidiary base-line will be the distance p o, which is forthwith read off. The reader will now understand the function and appreciate the utility of the divided trigonometer-plate, for if it were not for the scales on the plate the only elements of the triangle p p' o ascertainable by the instrument would be the base-line of the right-angle triangle p o p' and its angles o p p' and p p' o, the remaining elements being matter for arithmetical calculation. The dotted and broken lines of the figure are added to it to show the geometrical elements and complements of the problem, and the distances and angles are marked so that the correctness of the solution by my invention may be verified arithmetically if the reader wish to so verify it. Instead of moving the trigonometer from the station-point p to the second one p', a theodolite or any instrument adapted to take angles may be used at the last-mentioned point for taking the angle p p' o, to which the tangent-bar is then set. The trigonometer used as above described forms an efficient range-finder; but a useful modification of the instrument for this special purpose consists of half a graduated plate—i. e., one divided along the base-line D and having one tangent-bar pivoted at the outer extremity of the transverse base-line E, instead of at the center a. This modification is used as follows: The object is sighted along the base-line D and a measured base-line is set off, corresponding in length to the length of the transverse base-line on the plate—i. e., from the center a to the axis of the tangent-bar—according to the scale. The object is again sighted, but this time along the tangent-bar, and where the latter cuts the base-line defines the range.

*Problem 2. To ascertain the altitude of a distant object.* (See Fig. 4.)—Let o o' be the given object and p the station-point. First ascertain the distance p o by Problem 1 and read it off along the base-line D. I assume it to be three hundred yards, as in the previous problem. Then take the angle o p o' with the theodolite and transfer it to one of the quadrants of the protractor by setting the respective tangent bar. The intersections of the bar or bars with the chord-line which cuts the three-hundred point on the base-line D will give on the said chord-line the required altitude. Any necessary correction for height of trigonometer can then be made. In working such a problem as the above it will be seen that I first deal with the vertical plane to the extent of ascertaining the perpendicular and the apex angle of the triangle concerned and then turn that angle down into the horizontal plane to get at the base.

*Problem 3. To ascertain and lay down a curve joining the terminals of two straight portions of a line of railway by finding the apex angle of the curve.* (See Fig. 5.)—Let q q' be the two terminals. These are the only data the surveyor has given him. He first settles the station-point p (the apex angle) by getting sights of both terminals along the respective tangent-bars, taking care that both make equal angles with the base-line D. It is of the first importance that these angles should be equal—i. e., that the apex angle should be bisected exactly, inasmuch as any inaccuracy at this stage of the survey will vitiate every subsequent step. The point p may also be found by continuing the lines terminating in q q' until they intersect each other. Either tangent line $p\,q$ or $p\,q'$ is next chained off or its length ascertained according to Problem 1. Having ascertained the length of either line I note it on both tangent bars, and so transfer to the trigonometer the equivalents of the two tangent points $q\,q'$. The chord-line which cuts these two points is the equivalent of the chord $q\,q'$. The intersection of the radial bars, when they are set at the respective equivalents of the tangent points or the intersection of the base-line D by either radial bar, will give the center $c$ of the circle of which the curve $q\,v\,q'$ is an arc. It will also give a radius of the curve. The center point $v$ of this curve is the distance from the trigonometer-center (apex angle $p$) to the equivalent on the plate of the point $c$ less the length of a radius. $v\,s$ is the versed sine; $q\,s$ or $q'\,s$, the half-chord; $c\,s$, the cosine; and $q\,v$ or $q'\,v$ the chord of half the arc, all of which distances can be read off the instrument as it stands, excepting the chord of half the arc, which last can be obtained by transferring the distance $v\,s$ to the trigonometer from the center $a$ along the base-line D, noting the distance $s\,q'$, or half the chord upon the chord-line cutting D in the equivalent of $s$, and setting the tangent-bar to cut $v$ and $q'$.

*Problem 4. To set out the curve of Problem 3 upon the trigonomter-plate preparatory to pegging it out on the ground.* (See Fig. 6.)— For the purpose of showing the relation between the figure of this problem and that of the preceding one part of the latter figure— viz., the apex angle $q\,p\,q'$—and the two tangent lines $q\,p$ and $p\,q'$ have been introduced in dotted lines. Further, the same reference-letters are used in both figures for corresponding parts and lines. Transfer the angles $q'\,c\,s$ and $q\,c\,s$ of Fig. 5 to the trigonometer, treating the center $a$ of the latter as the equivalent of $c$, and after noting the length of a radius remove the radial bars from the instrument. Transfer the distances $c\,s$ and $v\,s$, also thereby noting on the trigonometer the centers of the circle and of the curve, respectively. Next, noting the length of a radius on a tangent-bar—say the left-hand one—set it to cut the subsidiary base-line—say the 5—next on the left of the base-line D with that distance, thereby producing the point 1, and the distance 1 2 will be the equivalent of the first ordinate. This process is repeated until the requisite number has been found. For the sake of convenience and accuracy, equidistant subsidiary base-lines are chosen, and if there is a fractional remainder in the half-chord it is left outside the last ordinate. It is not necessary to find ordinates on both sides of the base-line D. If they are found for only one side, that will suffice, as the two sides are counterparts of each other. As each point in the curve is found it can be pegged out.

*Problem 5. To find the radius of a curve without using a radial bar.* (See Fig. 7, which is a diagrammatic plan of the trigonometer. The curve is a reproduction of that of Figs. 5 and 6.)—Ascertain the apex angle and lay off one half of it, $c\,a\,q$ or $c\,a\,q'$, on the trigonometer by either tangent-bar. The figure shows both halves as laid off. Ascertain the length of a tangent line ($=a\,q$) and lay it off on the base-line D of the trigonometer from the center of the latter, giving $a\,x$. The half-chord line $x\,y$ so laid off from the base-line to the tangent-bar equals the radius of the curve.

*Problem 6. To find the range of any object—e. g., a fort or a ship—from a fixed station—e. g., a fort or a man-of-war.* (See Fig. 8.)—Let $s$ be the fixed station-point and $o$ the object. Plant the trigonometer with its center over $s$ and the base-line D coincident with the line $s\,t$. The transverse base-line will then be coincident with the line $s\,u$. Set the angle $t\,s\,o$ on the trigonometer by adjusting the right tangent-bar till it sights the object. At the same time a second surveyor with another trigonometer, or any instrument proper for taking angles, and having his station-point at $v$, takes the angle $x\,v\,o$. This second station-point may of course be either to the right or left of $s$, according to the relative position of $o$. The distance $s\,v$ is known—say one hundred yards. The left tangent-bar of the first trigonometer—i. e., the one at $s$—is then set to the angles $t\,s\,x$, which is transferred from $x\,v\,o$, already found, thereby giving the distances $s\,t$, $v\,x$, and $s\,x$. It may be remarked that the equivalent of $v\,x$ on the trigonometer will be the subsidiary base-line, one hundred units to the right of the center $a$. As $v\,x$ is common to both triangles $s\,x\,v$ and $x\,v\,o$, $s\,v$ and $x\,o$ are necessarily equal. Now the length of $s\,v$ is known one hundred yards and is read or measured off to the right along the chord-line, which passes through the equivalent on the trigonometer of the point $x$, and where it cuts the right tangent bar of the trigonometer planted over $s$ will be the equivalent of the object $o$. The distance $s\,o$ can then be read off the said bar. The distance $s\,x=v\,o$ can likewise be read off the left tangent-bar. It will be noticed that this problem, to some extent, resembles Problem 1. There is, however, a practical difference between them, which is this, that according to Problem 1 the observer can stand exactly opposite the object and start with a right angle. Circumstances will frequently, or rather in naval warfare do generally, arise to prevent the object being sighted from a point at right angles with it. For instance, (referring to Fig. 8,) let the points $s$ and $v$ be taken as on a man-of-war's deck and the point $u$ somewhere over the bows or astern. If it were impossible to take a distance with the trigonometer without being at right angles with the object, the vessel would have to change position before the range in question could be taken, whereas by means of my improved trigonometer a range can always be taken irrespective of the relative position of the object.

*Problem 7. To find a range at sea, either from*

*a fort or a man-of-war, onto a man-of-war either stationary or in motion.* (See Fig. 9.)—Let F be the fort or the deck from which the range is to be found on O, another man-of-war, either stationary or steaming past. Two instruments for taking angles T T′, trigonometers, for preference, are aligned as to their transverse base-lines. An observer stands at each. The two observers are attended by an assistant provided with a portable improved trigonometer, (i. e., one without the stand or theodolite, or the latter may be in the hands of the gunnery lieutenant.) Both observers sight, say, the mainmast. If either vessel be moving, both observations must be taken simultaneously. The internal angles T′ T O and T T′ O are forthwith reported to the assistant and transferred to his portable trigonometer, the center of which is treated as the equal of O, so that the angles T′ T O, T T′ O, T O t, T O t′, respectively, will be laid off on the outer quadrants of the protractor by the arms of the tangent-bars instead of by the tangent-bars on the quadrants upon the graduated portion of the plate. Where the chord-line of the length of the measured base-line T T′ cuts the tangent-bars will be shown the distances T O T′ O, and the intersection of the base-line D and the said chord-line will give the distance f O, *three distances found without any calculation from a pair of observations, and that in spite of both objects being in motion, perhaps at different speeds.*

*Problem 8. To find the distances respectively separating two objects—e. g., two men-of-war from a given point—e. g., a fort or another man-of-war—and also the distance separating the said two objects from each other, any one or more of the said objects and point being either moving or stationary,* (See Fig. 10.)—Lay down a convenient base-line t s and on it mark off the given point P and at a measured distance therefrom—say one hundred and seventy feet—a second point P′. Plant a trigonometer with its center over P and a second one over P′. Any instruments for taking angles may be used instead of trigonometers, but the latter are preferable. Q R are the two given objects. From P take the angles Q P P′ and R P s, with the left and right tangent-bars, respectively, and repeat the process from the point P′, which will give the angles Q P′ t and R P′ P. Then on a portable trigonometer lay off the angles Q P P′ and Q P t with the left and right tangent-bars, respectively. Where a chord-line of the length P P′ (being the equivalent of the line Q q) cuts the two tangent-bars will mark the equivalent of Q on the trigonometer and give the distance Q P on the bar. Next, on the trigonometer at P′ lay off the angle R P s with the right tangent-bar and the angle R P′ P with the left. Likewise where a chord-line of the length P P′ (being the representative of the dotted line shown in part on the figure running to the right from R) cuts the two tangent-bars will mark the equivalent of R on the trigonometer and give the distance R P′ on the bar. The equivalent of Q having been already noted on the portable trigonometer, it only remains to read off the distance Q R along the last-mentioned chord-line, if the latter suits. If, as will most probably be the case, it will not, then the distance is measured by a loose scale u, graduated to correspond with the scales of the trigonometer; or, instead of using a loose scale, the point Q may be transferred to the trigonometer-center a and the point R moved over the trigonometer-plate accordingly, the angle R Q q being carefully preserved. This can be readily done by measuring along a chord-line for the distance Q q′ and transferring it to the base-line D from a, and along a base-line for the distance q′ R and transferring it to a chord-line from q′. The two new positions of the points Q R having been ascertained, a tangent-bar is made to cut R, which gives the distance Q R. The portable trigonometer above referred to consists of the trigonometer-plate A, having protractor and base and transverse base lines, as well as subsidiary base and transverse lines, tangent and radial bars. It requires neither levels nor sights, and has not, of course, either theodolite or stand. It is preferably made larger than the surveying-trigonometer, so that it can be graduated more finely, and it may be of lighter material. I have already pointed out its practical utility in rapidly working out problems from data in the form of angles only ascertained by my improved trigonometer or any other instrument capable of measuring angles, and I have now to explain a more extended use to which this adaptation of my invention can be put. It is this: When surveys are being taken, all the work, or a good deal of it, at any rate, of ascertaining distances may be omitted and the outdoor work restricted to taking angles. These being noted in the survey-book, the remainder of the work can be done in the office at leisure upon a portable trigonometer, and that with the greatest facility and a greater accuracy than could be achieved in the field, inasmuch as the scales on the portable or office trigonometer being larger are more subdivided. Moreover, this trigonometer for office use may be only half the instrument illustrated in Fig. 1—i. e., it may consist of the plate divided along the base-line D. It will consequently have only one tangent and one radial bar.

*Problem 9. To ascertain the distance which a moving object—e. g., a steamer—makes in a given time, the rate at which she is steaming, and the course she is on.* (See Fig. 11.)—This problem is very similar to the preceding one. The demonstration of it need not be diffuse, and will nevertheless be easily understood. Let V represent the first position of the steamer and V V′ the course she is on. Lay down a convenient base-line t s of measured length in the same way as the base-line t s of Fig. 10. Take the angles V $ts$ and V $st$ simultaneously with the trigonometers standing over $t$ and $s$, respectively, and note the exact time at which these observations, which ascertain the point V, are made. So soon as the steamer has reached the end of that portion of her course which it is desired to measure—say V V'—take the angles V'$ts$ and V'$st$ and note the exact time at which these latter observations, which ascertain the point V', are made. Transfer the point V to the trigonometer-center $a$ and note the relative position of the point V' on the plate, carefully preserving the angle V' V V$^2$. The line V V$^2$ will now be along the base-line D on the plate. The right-hand tangent-bar is next adjusted to cut the point V', when the distance V V' is read off the bar. A comparison of this distance with the time which elapsed between the two observations will give the rate at which the steamer is sailing, and the course on which she is sailing is ascertained by laying a compass axially over the trigonometer-center with its north pole preferably over the base-line D.

*Problem 10. To set out a series of points along an imaginary line—e. g., a series of sounding-points or the points of a line of piers, or to solve analogous problems.* (See Fig. 12.)—Let Y Z be the line upon which the points are to be taken at distances twenty yards apart, the nearest one being one hundred and thirty yards from the shore. Set out a line at right angles with the line Y Z and cutting the point Y. Measure off along it right and left from the point Y a pair of distances Y $w$ and Y $x$. They are, for the purpose of this demonstration, assumed to be one hundred yards each. A trigonometer with a single tangent-bar only is placed over each point $w$ and $x$, both instruments having their transverse base-lines carefully aligned with the base-line $w x$. The base-lines D D of the trigonometers will then be parallel with the line Y Z, coincident with the lines $w$ $w'$ and $x$ $x'$, respectively, and be the counterparts of Y Z, while their centers $a$ will be the counterparts of the point Y. The man at $w$ then selects that subsidiary base-line $d$ on his trigonometer-plate to the right of the base-line D thereon, which is for him the counterpart of Y Z, and the man at $x$ does the like, only he selects his subsidiary base to the left of his base-line D. The sounding staff row out in the direction Z, while the men at $w$ and $x$ make their tangent bars cut the points on their base-lines corresponding to a distance of one hundred and thirty yards from Y. When the sounding staff reach station No. 1, which they do when, say, a flag-staff at the stern is sighted by both men along their tangent-bars simultaneously, they are stopped by signal and the sounding is taken. The angles 1 $w$ Y and 1 $x$ Y may also be noted. The tangent-bars are then set to cut the respective base-lines D at points thereon corresponding with points one hundred and thirty by twenty yards from the point Y, and the sounding-boat is stopped, as before, at the station No. 2, the sounding taken, and the angles 2 $w$ Y and 2 $x$ Y noted. The process is repeated until all the soundings have been taken. Notes of the positions $w$ and $x$ and the series of angles 1, &c., $w$ Y, and 1, &c., $x$ Y, will always fix the sounding-stations. The boat may be kept on the course Y Z by erecting a flag at Y and one before and another behind it, both aligned with Y and Z. The oarsmen will then require only the stopping and no directing signals to be given to them.

Referring to Figs. 13 and 14, the trigonometer-plate A is replaced by a frame A' and a non-graduated plate C', upon which the protractor only is engraved. B is a central bar, one of its edges $b$ being the equivalent of D. There are no subsidiary base-lines, and as there is no plate there are no chord-lines. Instead of the latter I provide a double-headed T-square I' or chord-bar adapted to slide up and down the frame. Its heads $i'$ $i'$ engage with the frame, so as to act as guides to the extent of keeping it always truly at right angles with the base-line $b$. It is graduated with a duplicate scale $i^2$, which is the equivalent of a chord-line $e$ of Fig. 1. In short, instead of there being a series of fixed chord-lines, there is one chord-line on a movable chord-bar. Any suitable connection may be made between the chord-bar and the radial bars, so that the motion of the former upon the frame A may produce a corresponding motion on the part of the radial bars along the tangent-bars.

J is a graduated T-square adapted to slide by its head upon either of the tangent-bars at right angles therewith. It is graduated with a scale having its zero coincident with the scale on the tangent-bar.

I wish to point out that there is this advantage in having two tangent-bars—viz., that observations can be taken with both bars, one acting as a check on the other. The other corresponding parts are as follows:

In Figs. 13 and 14, K is the equivalent of $a$ in Figs. 1 and 2; D' is the equivalent of C; E' and E$^2$ are the equivalent of F and G, respectively; F' and F$^2$ are the equivalent of $f$ and $g$, respectively; $f'$ and $f^2$ are the equivalent of $f'$ and $g'$, respectively; $g'$, $g^2$, and G' are the equivalent of N' N' and the circular groove; H' and H$^2$ are the equivalent of H and J, respectively; $k^2$ $k^2$ $k^2$ are the equivalent of $k$ $l$ $l'$, respectively; $m^3$ $m^4$ are the equivalent of $m$ $m'$, respectively.

Sights may be fixed at the ends of the transverse base-line.

All the scales on the modification have a common unit.

M is a four-legged or other convenient type of stand. A pillar $n$, connected to the stand by a ball-and-socket or other equivalent joint $m$, springs from the top of the stand.

$m'$ is the eye from which the plumb-line is suspended.

$n'$ is a plate fixed upon the pillar at right angles to its axis and serves as a table upon which the frame can be rotated and fixed by suitable fixing devices—e. g., a fixing-screw $n^2$. The axis of the pillar $n$ passes up through the center $k$ of the trigonometer.

$m^4\ m^4$ are leveling-screws.

O is an ordinary theodolite having a vernier $o$ for the purpose of measuring off horizontal angles upon the protractor. When it is used in conjunction with the trigonometer, it is fixed upon the pillar $n$, or rather upon a vertical continuation of it, so that both theodolite and continuation can be removed and the removable sight $O'$ used. This substitution of the sight $O'$ for the theodolite is convenient for short-distance work.

The use of the T-square J is as follows: Referring to Fig. 5, to obtain the position of the center of the curve $q\ v\ q'$—viz., the point $w$—deduct the length of a radius $c\ q'$ from the hypotenuse $c\ p$ by sliding the T-square along its tangent-bar until the distance between it and the tangent point $q'$ (278 on tangent-bar $E^2$, see Fig 15) is equal to the half-chord $s\ q'$ as the latter reads on the chord-bar; or when the triangle formed by the two tangent-bars and the chord-bar is an equilateral one slide the said square on its tangent-bar until its scale cuts the opposite tangent point, and where it also cuts the base-line is the center $v$.

Having now particularly described and ascertained the nature of my said invention and in what manner the same is to be performed, I declare that what I claim is—

1. The combination of trigonometer-plate graduated in two directions at right angles with each other, protractor having its center coincident with the center of the trigonometer-plate, graduated tangent-bar pivoted about and having its zero-point coincident with the said center of the trigonometer-plate, and an adjustable joint adapted to connect the said plate to the stand of the trigonometer and to allow the said plate to be held upon the said stand in the vertical plane upon either the right or the left hand of the position of the center of the trigonometer-plate when the latter is in the horizontal plane or to be deflected either in front of or behind the said center, as set forth.

2. The combination of protractor, base-line, tangent-bar, radial bar, and chord-bar, as set forth.

3. The combination of protractor, base-line, a pair of tangent-bars, and a pair of radial bars, as set forth.

4. The combination of protractor, base-line, a pair of tangent-bars, two radial bars, and a chord-bar, as set forth.

5. The combination of tangent bar, base-line, chord-bar, and T-square adapted to bisect either or both base-line or chord-bar, as set forth.

In testimony whereof I have hereunto affixed my signature, in presence of two witnesses, this 2d day of June, 1890.

ROWLAND BROTHERHOOD.

Witnesses:
HENRY H. LEIGH,
22 *Southampton Buildings, London.*
THOMAS LAKE,
*Gracechurch Street, London.*